United States Patent [19]
Chien

[11] Patent Number: 5,722,757
[45] Date of Patent: Mar. 3, 1998

[54] DISTRIBUTED ILLUMINATION ARRANGEMENT FOR A SOFT OBJECT

[76] Inventor: Thang Lu Chien, 8F, No. 29, Alley 73, Lin-Shon Street, Shi-Chi Town, Taipei, Haeng, Taiwan

[21] Appl. No.: 614,001

[22] Filed: Mar. 11, 1996

[51] Int. Cl.⁶ .................. F21L 15/08; F21V 8/00
[52] U.S. Cl. .................. 362/32; 362/103; 362/800; 36/137
[58] Field of Search .................. 362/32, 103, 800, 362/806, 190, 191, 184, 31; 36/137

[56] References Cited

U.S. PATENT DOCUMENTS

| | | |
|---|---|---|
| 4,035,630 | 7/1977 | Burke . |
| 4,173,201 | 11/1979 | Chao et al. . |
| 4,216,464 | 8/1980 | Terry . |
| 4,423,539 | 1/1984 | Ivanhoe . |
| 4,425,600 | 1/1984 | Barnhart . |
| 4,438,482 | 3/1984 | Leon et al. . |
| 4,480,293 | 10/1984 | Wells . |
| 4,935,682 | 6/1990 | Stephens . |
| 4,935,851 | 6/1990 | Wood . |
| 5,249,106 | 9/1993 | Barnes et al. ............... 362/32 |
| 5,370,082 | 12/1994 | Wade . |
| 5,424,922 | 6/1995 | Wise . |
| 5,430,621 | 7/1995 | Raskas . |
| 5,465,197 | 11/1995 | Chien . |
| 5,542,016 | 7/1996 | Kaschke ...................... 362/32 |

FOREIGN PATENT DOCUMENTS

121-026-A 10/1984 European Pat. Off. .

*Primary Examiner*—Thomas M. Sember
*Attorney, Agent, or Firm*—Bacon & Thomas

[57] ABSTRACT

An illumination arrangement for a soft object such as an article of wearing apparel utilizes a light emitting diode as a light source and an optical element coupled with the light emitting diode to enhance the visibility of the illumination arrangement by distributing light emitted by the diode uniformly over a length or surface area of the optical element. The optical element may for example form part of a lace assembly, strap, or decorative panel of a shoe, boot, or sandal.

18 Claims, 10 Drawing Sheets

DISTRIBUTED ILLUMINATION ARRANGEMENT FOR A SOFT OBJECT

BACKGROUND OF THE INVENTION

1. Field of the Invention

This invention relates to an illumination arrangement which can be applied to soft objects such as footwear, clothing, bags, and headwear. More particularly, the invention relates to an illumination arrangement including an optical device for uniformly distributing light emitted by a light emitting diode over an extended length or surface area.

2. Discussion of Related Art

For many applications, it is desirable to distribute light over a relatively extended length or surface area. This can be accomplished, for example, by distributing a light emitting material over the length of a tube or panel. However, distributed material arrangements are relatively heavy, inflexible, and expensive, and therefore cannot be used in the class of applications with which the present invention is concerned, namely articles of apparel and other relatively inexpensive, soft, and lightweight objects.

Instead of distributing the light emitting material over the length of a tube, panel, or other object, it is also known to provide an optical element for distributing light emitted by a point source. This alternative provides greater design flexibility for both the optical element and the point source, and in theory allows the designer to select a relatively small and inexpensive point source such as a light emitting diode for use as the principal light emitter while distributing the light by means of, for example, a flexible, lightweight fiber or tube.

The most common use of fiber optic tubes is for transmitting light beams emitted by a point source, such as a light emitting diode, over an extended distance. In general, however, such tubes are not designed to distribute light emitted by the source over the length of the tube, but to the contrary are designed to transfer light from one end of the tube to the other without losing any of the transmitted light through the wall of the tube or fiber. While a light emitting diode emits sufficient light to be carried in this manner for a long distance, in applications where visibility of the tube rather than transfer of light is the objective, the amount of light emitted by a light emitting diode diminishes significantly with distance from the source, such that only approximately the first three centimeters of a conventional fiber having at least partially transparent walls can be illuminated using a light emitting diode as the point source.

To solve this problem, a higher power light source, such as a 50 W–300 W halogen bulb, can be used, but the power requirements and weight of the halogen bulb are unsuitable for soft object applications of the type described above, particularly clothing, footwear, and headwear.

Using light emitting diodes rather than higher power light emitters as the light source in a distributed light illumination arrangement has a number of advantages in terms of cost and weight which makes light emitting diodes especially suitable for soft object applications. These advantages include not only low power consumption, low cost, and light weight, as indicated above, but also ease-of-assembly to the soft object, and the ability to be controlled by relatively simple control circuitry. However, in practice, the limited brightness and narrow viewing angle of currently available light emitting diodes severely limits their effectiveness as lighting elements by themselves, and has heretofore prevented light emitting diodes from being used as sources for light tubes or other large area lighting elements.

While magnification of the emitted light through the use of lensing effects and reflectors can increase the area of visibility of a light emitting diode, the thickness of the element required decreases coupling effectiveness and the corresponding decrease in intensity as the light travels through the optical element and spreads out makes the use of light projectors as ineffective as the use of conventional fiber optic tubes or light guides.

An example of the type of soft object with which the present invention is concerned is footwear. Illumination of footwear can greatly increase the safety of pedestrians, children, joggers, and others by increasing their visibility to motorists during inclement weather and at night, but only if the illumination is provided over a large enough area to make the footwear visible from a great enough distance and at a wide range of angles. However, a practical way of using light emitting diodes for this purpose has yet to be achieved. It was, for example, proposed by the current Inventor in U.S. patent application Ser. No. 08/611,049, filed on Mar. 5, 1996, to place extended area illumination elements such as electro-luminescent strips or panels in the laces or straps of footwear and thereby achieve an extended area lighting effect, but no suggestion was made to utilize a light emitting diode/optical element combination to achieve the extended area illumination effect.

The only prior proposal to use light emitting diodes in combination with an extended length or surface area light distributing element is found in U.S. Pat. No. 5,430,621, which discloses a shoelace illumination device having a light emitting diode as the source for extended area illumination and braided fiber optic bundles or ribbons for distributing the emitted light. While the use of a strand of fibers increases the area of illumination and solves certain practical problems with single fibers, the arrangement disclosed in this patent can at best achieve a coupling ratio between the large area light emitting diode and the fibers of about 50%. In addition, the arrangement disclosed in this patent requires a housing which is far too large to put on top of a shoe surface, and the circuit disclosed therein is without any power saving features and therefore has a short useful life. Unlike the present invention, the braided outer surface of the fiber bundles disclosed in the prior patent does not take into account transmission and diffusion laws for different densities to provide for maximum output over the extended area of the fibers, and the significant loss of light at the input to the fiber optic bundle makes the arrangement disclosed in the prior patent unworkable in practice.

Other patents disclosing illumination arrangements for soft objects include U.S. Pat. Nos. 5,151,678, 5,149,489, 5,027,259, 4,935,851, 4,848,009, 4,839,777, 4,727,603, but none of these patents discloses extended area illumination utilizing a light emitting diode light source in combination with an optical light distributing member, and none are practical from the perspectives of cost and ease-of-assembly. Similarly, various prior art devices are known which use a hard block or sheet of acrylic material to provide a medium for transmitting and distributing light beams over an extended area, but the use of rigid illumination arrangements is not practical for soft material objects of the type disclosed in the present application, such as clothing, footwear upper or laces, beach sandal straps, in-line skate boots, and caps.

SUMMARY OF THE INVENTION

It is accordingly an objective of the invention to provide an illumination arrangement including an optical element having an extended length or surface area which can be applied to soft objects such as clothing, footwear, or headwear, and in which light from a source is uniformly distributed over the entire length or surface area of the optical element.

It is a further objective of the invention to provide an illumination arrangement for soft objects such as clothing, footwear, or headwear and which uses inexpensive light emitting diodes as a light source while at the same time providing uniform illumination over an extended length or surface area of an optical element.

It is a still further objective of the invention to provide an illumination arrangement in which the source of light is a light emitting diode coupled with an optical element for distributing the light over an extended area, and in which the light emitting diode can be freely selected according to the requirements of the application to have a wide range of brightness ratings (e.g., 300 mcd to 12,000 mcd (12 cd)), and a variety of viewing angles, colors, diameter, and shapes.

These objectives are achieved, in accordance with the principles of a preferred embodiment of the invention, by forming the flexible optical element used to uniformly distribute light from the light emitting diode of a solid material having an index of refraction lower than that of air (and therefore a speed of light in the material that is higher that the speed of light in air) so that at least a portion of the light transmitted by the light emitting diode is internally reflected between surfaces of the medium in the manner of an optical fiber, and the remainder is refracted out of the optical element, the transmittivity of the optical element being varied along the length or surface area of the optical element to increase the transmittivity of the optical element away from the light source and thereby provide uniform illumination.

In accordance with an especially preferred embodiment of the invention, the increase in transmittivity of the optical element is obtained by roughening or "sand blasting" the optical element to have a density variable with distance from the point at which the light source is coupled thereto. The roughening process in this preferred embodiment of the invention is achieved by using highly pressurized air to direct a hard granular or particulate material of varying sizes and/or densities at the optical surface, which is conveniently injection molded, and create tiny holes and scratches in the surface, the holes and scratches causing the diffusion of light through the surface, or internal reflections in the optical element, to vary in a controllable manner.

Advantageously, in addition to being used to vary the transmittivity or internal reflectivity of a surface of the optical element, the device used to roughen the surface of the optical element can also be used to create concave grooves for refracting light out of the optical element at selected positions and thereby create design effects such as letters, characters, and other designs. Moreover, those skilled in the art will appreciate that the same effect can be achieved by creating the groove patterns during molding or formation of the optical element, before roughening or sand blasting.

The diffusion and transmission principles of the preferred embodiment of the invention, in which selective roughening of the surface of the optical element is used to create a uniform illuminance over the entire length or surface area of and optical element, can advantageously be applied to a variety of soft objects, although application to the lace, strap, or decorative panel of a footwear is especially advantageous.

For example, the lace to which the principles of the preferred embodiment of the invention are applied can be in the form of an 18" optical device with a flat-type LED, the optical device being held in a saddle-like holder to permit an LED to be mounted inside of the optical device so that light is evenly transmitted within all diffusion walls and travels the entire 18" length of the lace without any coupling losses between the light source and the optical element.

Because the optical device is flexible, it can be bent to pass through all eyelets, one-by-one, to the top of the footwear, with a lace material within which the optical element is contained being chosen to have a very narrow deviation in width even when pulled from the two ends. For example, a suitable lace material is 300D nylon lace, typically has a maximum width change of 5 mm to 8 mm. The lace can be assembled by threading the flexible optical element through an envelope-shaped lace material, using a sharp tipped instrument to move the nylon aside and form a hole into which the flexible optical device with its LED and a miniature printed circuit board are inserted. The invention can of course also be applied to laces having normal lace netting.

According to a second preferred embodiment of the invention, the illumination arrangement is applied to a decorative or functional strap or panel of the type used in sandals, athletic shoes, caps, and so forth. The optical device is sandwiched between existing layers of the strap or panel material, and since the optical device is only a few millimeters thick, can easily be held in the strap or panel by stitching, glue, or other attachment means, the strap or panel including a window or transparent area through which the light beam is visible. Alternatively, the optical device may be applied directly to the strap or panel surface by stitching or glue, or by simply threading the optical element through eyelet holes in the strap or panel. Whether sandwiched between layers of the strap or panel, or applied to its surface, those skilled in the art will appreciate that the illuminated strap or panel of this embodiment of the invention can be assembled with minimal extra cost or assembly steps.

Those skilled in the art will appreciate that the optical device of both the first and second preferred embodiments of the invention can have any desired geometric shape, including a plate, sheet, tube, bar, cylinder, so long as the material has an appropriate index of refraction and a diffusion surface treated in the manner described above, i.e., by roughening or sand blasting the surface to increase the transmittivity of the surface with increasing distance from the light source.

The light emitting diode which serves as the source of transmitted light for the preferred embodiments of the invention may, according to further preferred embodiments of the invention, be connected with a control circuit having electric components pre-arranged to provide such lighting effects as steady illumination, random or steady flashing, and fade in/out effects, as well as chasing and time delay effects for multiple light emitting diode and optical element assemblies, and photo-sensitive or motion responsive switching, etc., and all such performances can be achieved through use of either traditional or integrated circuitry.

Advantageously, according to the further preferred embodiments of the invention, power consumption may be reduced by using high frequency flashes or a duty cycle with a limited on-time rate as disclosed in U.S. Pat. No. 5,175, 528. An example of suitable control parameters for saving power are a frequency of 8 kHz, an on-time rate of around 18%, a charging rate of 25%, an off-time rate of 57%. In the case of fade in/fade out effects, a delay of two seconds can be used. In addition, further power savings can be achieved by using a smaller battery and an inductor circuit for raising the voltage output of battery to provide the LED trigger voltage. Those skilled in the art will appreciate that the resulting high frequency on/off cycle control circuit with voltage raising will be especially advantageous in footwear applications where minimizing the size and number of batteries is critical due to the narrow spaces available and the need for minimizing weight.

BRIEF DESCRIPTION OF THE DRAWINGS

FIG. 17A is a perspective view illustrating details of the embodiment illustrated in FIG. 17.

FIG. 18A is a perspective view illustrating details of the embodiment of FIG. 18.

FIGS. 19, 19A, and 19B are perspective views illustrating various alternative shapes for the optical elements used in the preferred embodiments of the invention.

FIG. 20 is a perspective view showing two conventional light emitting diodes having different shaped that are suitable for use in the preferred embodiments of the invention.

DETAILED DESCRIPTION OF THE PREFERRED EMBODIMENTS

Figure 1:
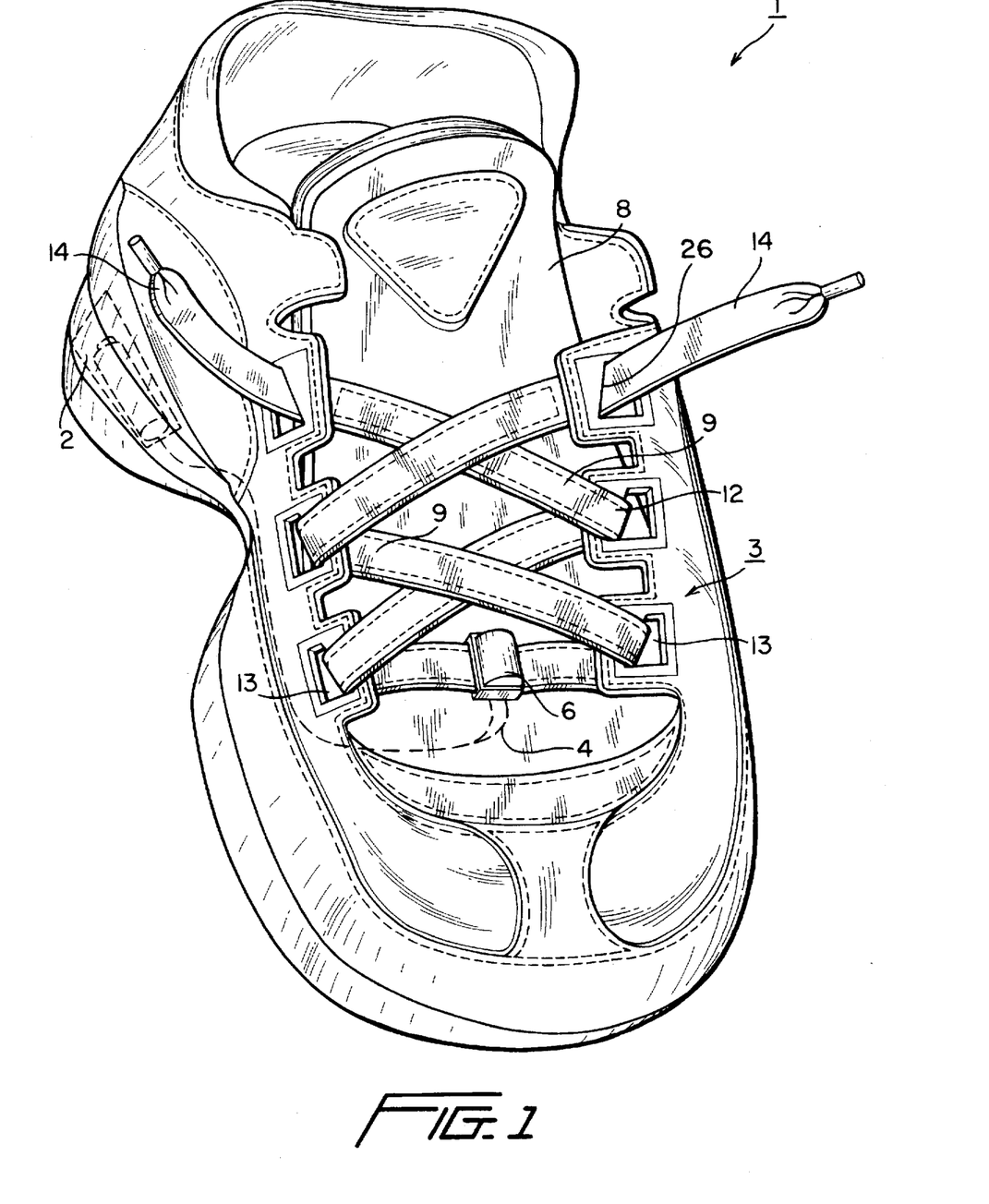
FIG. 1 is a perspective view of a soft object including an illumination arrangement constructed according to the principles of a first preferred embodiment of the invention.

FIG. 1 illustrates a soft object 1 to which an illumination arrangement constructed in accordance with the principles of a first preferred embodiment of the invention has been applied. The soft object 1 is in the form of an athletic shoe which is entirely conventional except for the presence of a power pack 2 sealed within the heel, a lace assembly 3 illuminated in the manner described below, and wires 4 connecting the lace assembly and the power pack.

As illustrated in FIG. 1, and in greater detail in FIGS. 2–5, the lace assembly of this embodiment of the invention includes a mounting assembly 5 made up of a bracket 6 attached to a mounting strip 7, which in turn is attached to the tongue 8 of shoe 1, two flexible transparent optical elements 9, a miniature circuit board 10 on which a pair of light emitting diodes 11 are mounted, and a lace material 12 in which the optical elements are positioned, the optical elements 9 being centered at bracket 6 and extending, together with the lace material, through each of the eyelets 13 of the shoe, with the lace material 12 including extensions 14 beyond the ends of the optical elements and the uppermost eyelets to permit tying of the lace assembly after placement of the shoe 1 on a user's foot.

Figures 2, 3, 4:
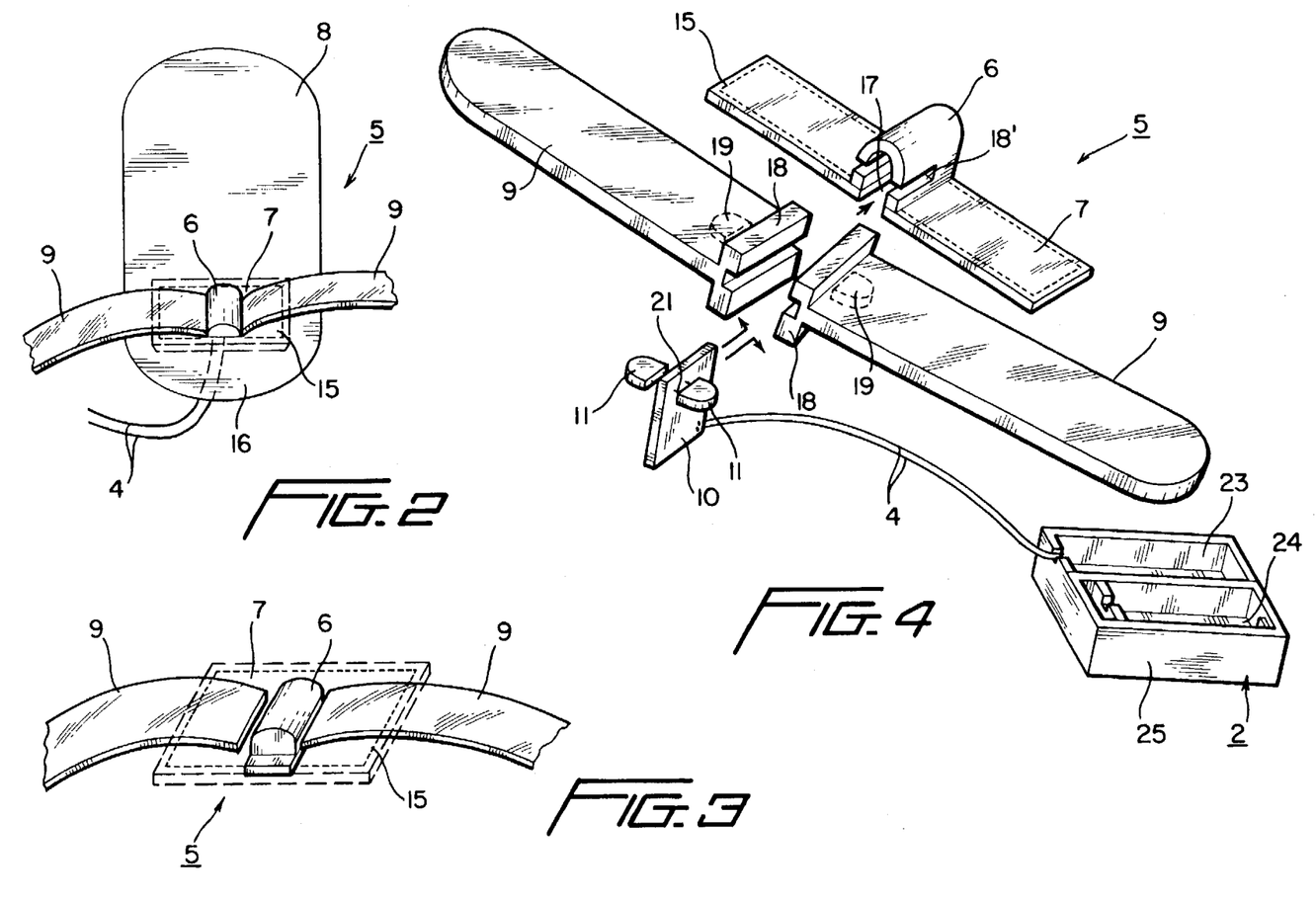
FIGS. 2–5 are perspective views showing details of the illumination arrangement of FIG. 1.
Figure 5:
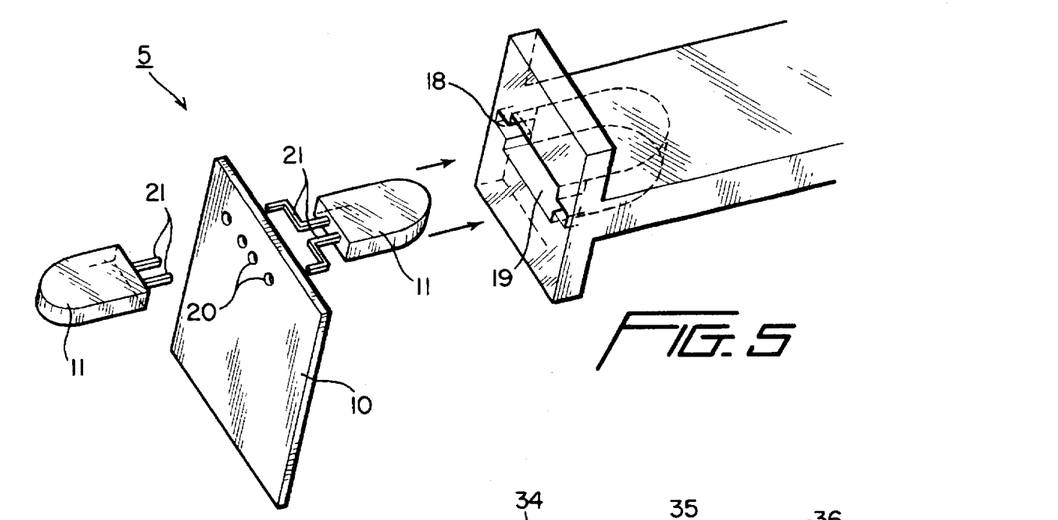

As is best illustrated in FIG. 4, the mounting strips 7 extend laterally from bracket 6 and are made of a soft material to permit stitching 15 of the strips to a layer 16 of the tongue, schematically illustrated in FIGS. 2 and 3, in order to permit installation of the bracket during the tongue assembly process without the need for additional assembly steps other than the basic stitching. It will be appreciated by those skilled in the art, however, that attachment of the mounting strip 7 to the tongue of the shoe may also be achieved using attachment means other than stitching, and that the invention is not necessarily limited to stitching, particularly in situations where the tongue does not have multiple layers between which the mounting strips can be stitched. It will of course also be appreciated that the mounting bracket could be directly secured to the tongue or other portions of the shoe, and that mounting attachments to the bracket 6 need not necessarily be in the form of strips.

The bracket itself, as illustrated in FIG. 4, is a member having a central opening 17 for receiving and holding base members 18 of the optical elements 9 and slots 18' for permitting exit of the optical elements from the bracket. Base members 18 of the optical elements in turn include openings 19 shaped to accommodate light emitting diodes 11 mounted to opposite sides of miniature circuit board 10, the board including openings 20 for receiving light emitting diode leads 21 and traces (not shown) for connecting the leads 21 of the light emitting diodes to wires 4. Although it is possible to include electrical components on the circuit board 10, in the preferred embodiment, at least the majority of control circuit components and the power supply 22 are housed within compartments 23 and 24 of a housing 25 which is conveniently sealed within the outsole or heel of the athletic shoe.

Those skilled in the art will appreciate that the use of appropriately shaped openings in the optical elements serves to ensure maximum coupling of light emitted by the diodes into the optical elements, with a minimum of losses, and at the same time serves to seal and protect the light emitting diodes from damage.

An additional feature of the preferred embodiment as illustrated in FIG. 1 is the use of eyelets 13 having one edge 26 which is angled to be transverse to the direction at which the lace assembly 3 leaves the eyelet on its way to the next higher eyelet so as to minimize stress on the optical elements 9 contained within the lace assembly. To further minimize stress on the optical assembly, edges 26 may be radiused, although it should be appreciated that the invention can also be applied to footwear having conventional round eyelets or holes for receiving the laces.

The light emitting diode which serves as the source of transmitted light for the preferred embodiments of the invention may be connected with a control circuit having electric components pre-arranged to provide such lighting effects as steady illumination, random or steady flashing, and fade in/out effects, as well as chasing and time delay effects for multiple light emitting diode and optical element assemblies, and photo-sensitive or motion responsive switching, etc., and all such performances can be achieved through use of either traditional or integrated circuitry.

Advantageously, power consumption of the light emitting diodes used in this embodiment may be reduced by using high frequency flashes or a duty cycle with a limited on-time rate as disclosed in U.S. Pat. No. 5,175,528, discussed above. An example of suitable control parameters for saving power are a frequency of 8 kHz, an on-time rate of around 18%, a charging rate of 25%, an off-time rate of 57%. In the case of fade in/fade out effects, a delay of two seconds can be used. In addition, further power savings can be achieved by using a smaller battery and an inductor circuit for raising the voltage output of battery to provide the LED trigger voltage.

Figure 6:
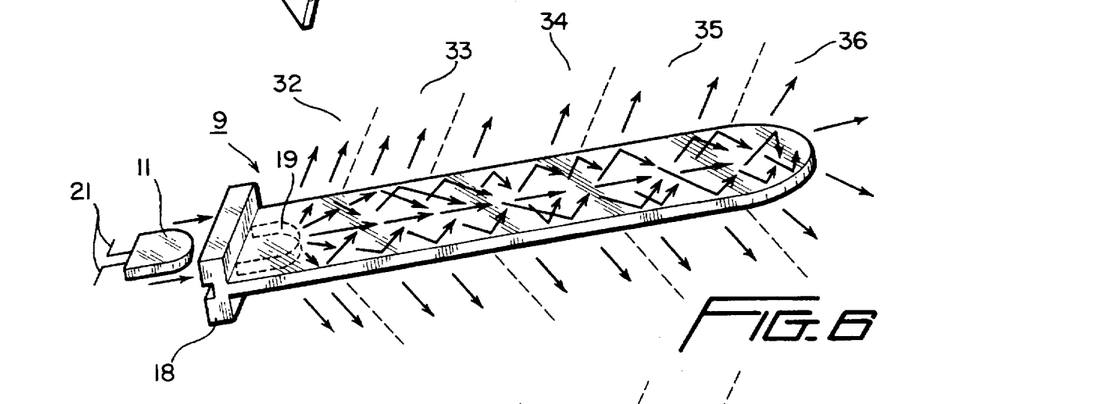
FIGS. 6 and 6A are perspective views illustrating, respectively, the manner in which the embodiment of FIGS. 1–5 operates before and after roughening of the surface of the optical element according to the principles of the preferred embodiment of the invention.
Figure 6A:
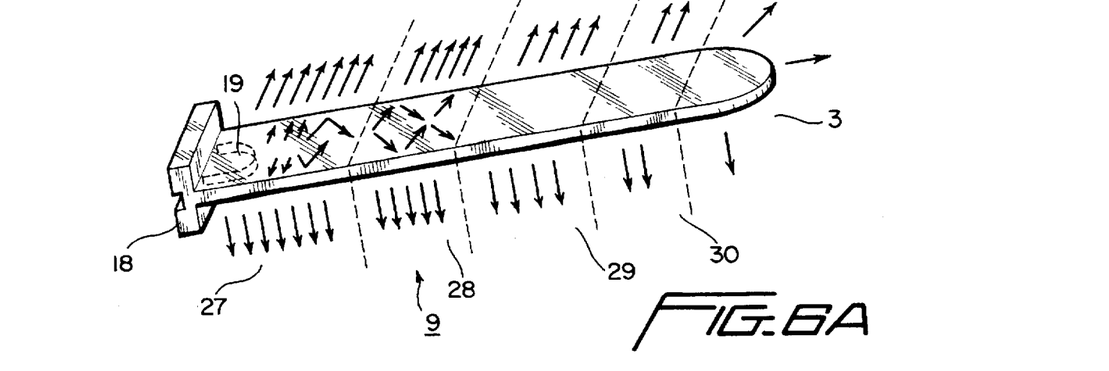

The manner in which the optical elements are treated to achieve a uniform illuminance effect is illustrated in FIGS. 6, 6A, and 7-11. FIG. 6A illustrates a light distributing optical element before treatment according to the preferred embodiment in which light is permitted to travel from the light source along the length of the optical element by internal partial reflections, with some of the light being internally reflected and some of the light being transmitted at surfaces of the optical element, and with each arrow representing an equally intensity of light. As is apparent from this Figure, most of the light is emitted a short distance from the light source coupling end of the optical element. By way of example, in FIG. 6A, fourteen units of light represented by fourteen arrows are illustrated as exiting a first length 27 of the optical element, ten units as exiting the second length 28, eight units as exiting the third length 29, four units as exiting the fourth length 30, and three units as exiting the fifth length 31.

In contrast, after treatment of the optical element according to the principles of the preferred embodiment of the invention, as illustrated in FIG. 6, the light exiting the optical element is distributed such that four units of light, by way of example, exit each of the lengths 32-36 of the treated optical element. this is accomplished by variably roughening the surface of the optical element such that less light is able to diffuse through the surface of the optical element adjacent the coupling portion, so that more of the light is internally reflected towards the distal end. Roughening can be achieved by directing a pressurized air stream containing particles of an abrasive material at the optical element after manufacture to, in effect, "sand blast" the surface of the optical element.

Figure 6B:
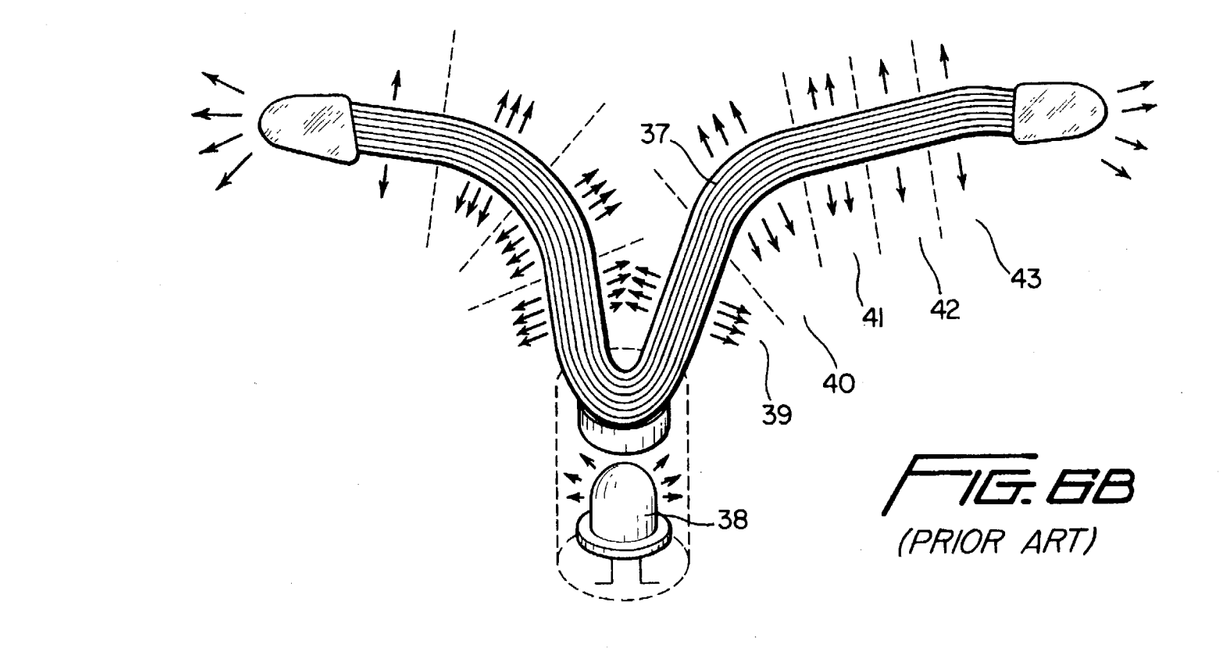
FIG. 6B is a perspective view of a prior art soft object illumination arrangement.

As a result of the sand blasting effect, together with the improved coupling of the light emitting diode with the optical element resulting from the provision of an opening 20 having a shape corresponding to the shaped of the diode head, light is uniformly emitting over the entire length of the optical element. In contrast, the prior art arrangement illustrated in U.S. Pat. No. 5,430,621, in which the light distributing member is a strand 37 of multiple fibers coupled at ends of the fibers with a relatively large area light emitting diode 38, and which is illustrated in FIG. 6B, exhibits poor coupling between the light source and the optical element, due to the loss of light from sides of the light emitting diode which do not face the strand of fibers, and a loss of emission intensity over lengths 39-43 of the fibers in a manner similar to that exhibited by the un-treated optical element of the present invention, even with the addition of a large additional optical element at the ends of the fibers.

Figure 7:
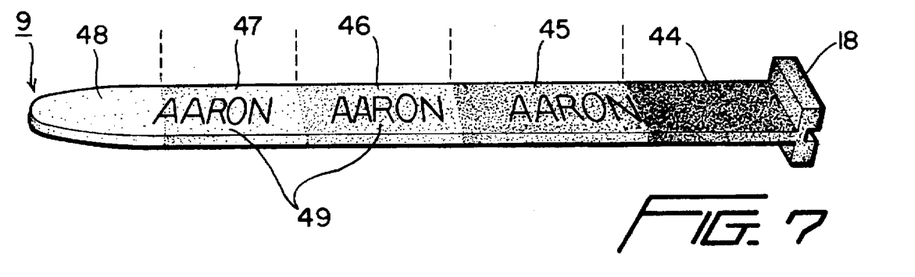
FIGS. 7–11 are perspective views illustrating surface treatment variations for the optical element used in the embodiment of FIGS. 1–5.

FIG. 7 shows the manner in which the surface of one of the optical elements is roughened starting at the base member 18. As illustrated, a high density of particles is added to the airstream during treatment of the first section 44 of the optical element to permit only 20% of the light reaching this section from the light emitting diode source to be emitted, a lower density of particles is added to the airstream for the second section 45 such that 25% of the light reaching this section (80% of the light incident on the first section) is emitted through the surface of the section, an even lower density of particles is added to the third section 46 such that 33% of the light reaching this section (60% of the first section incident light) is emitted out, and the lowest density of particles is added to the airstream directed at the fourth section 47 so that 50% of the light incident on this section (40% of the light incident on the first section) is emitted, while all of the remaining light is emitted by the last section 48. As a result, an even 20% of the incident light is emitted through the surface of each section of the optical element.

Of course, as those skilled in the art will appreciate, the example of five sections should not be construed as limiting. An even more uniform illumination effect could be obtained by increasing the number of steps by which the light diffusion capabilities of the surface of the optical element are varied with distance from the source, while fewer steps could be used as a cost saving measure. In addition, the same principles could be applied to optical elements of shapes other than the illustrated strip-like shape, including optical elements in which light is emitted along two dimensions rather than the single dimension (length) of the strip.

Figure 8:
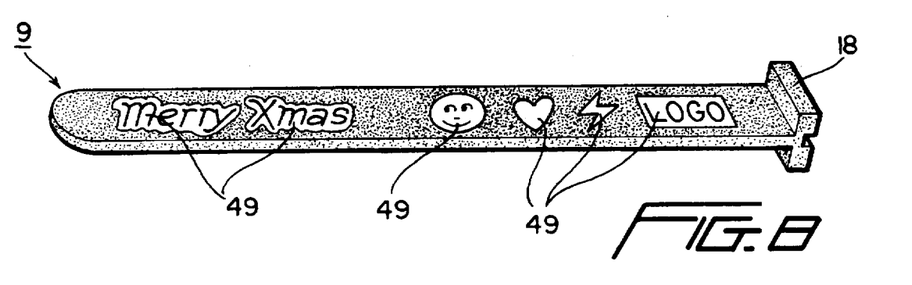

In addition to obtaining a uniform illumination effect between sections, areas of the optical element can be masked or carved to form areas of different transmittance or diffusion properties and thereby form patterns 49 in the illumination, as illustrated in both FIGS. 7 and 8. For example, by forming concave grooves in the surface of the optical element, light can be refracted directly out of the optical element and the designs formed thereby will appear to pop out of the surface of the optical element. Of course, designs can also be formed on the optical element by conventional printing processes.

Figure 9:
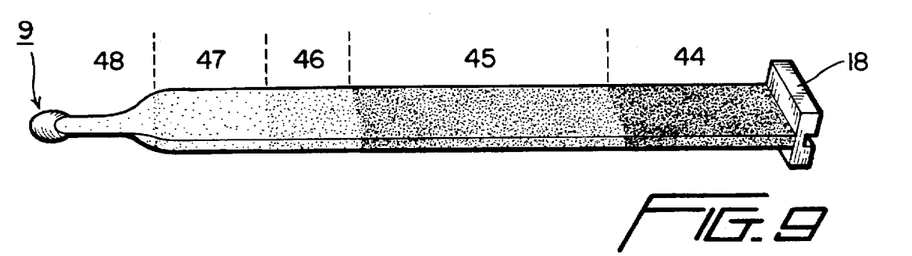
Figure 10:
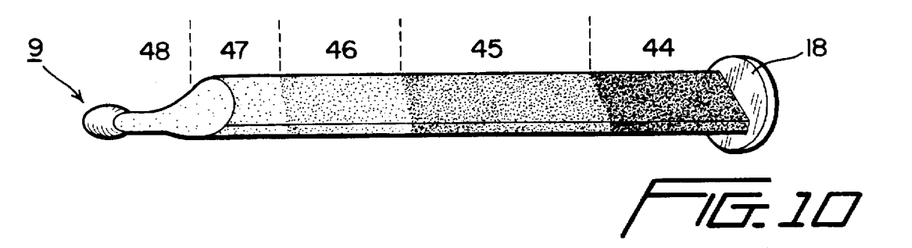
Figure 11:
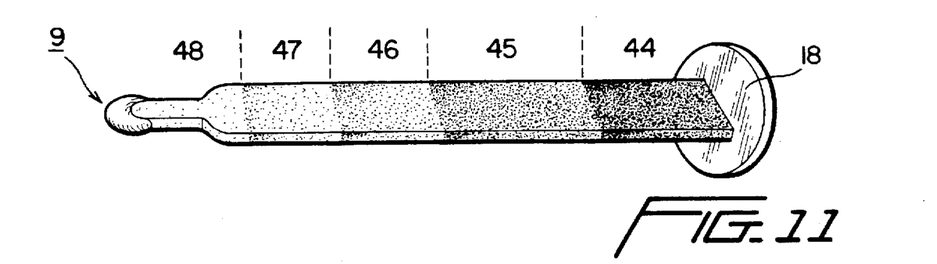

Further possibilities for varying the structure of the optical element include providing the optical element with a pointed end to make it easier to insert the optical element into a lace material envelope 50 to form the lace assembly, as illustrated in FIG. 9, variation in the cross-section of the optical element from rectangular as shown in FIG. 9 to circular as shown in FIG. 10 to permit insertion into different types of soft object, such as a collar or piping, and variation of the base member for the flat element of FIG. 9, as illustrated in FIG. 11.

Figure 12:
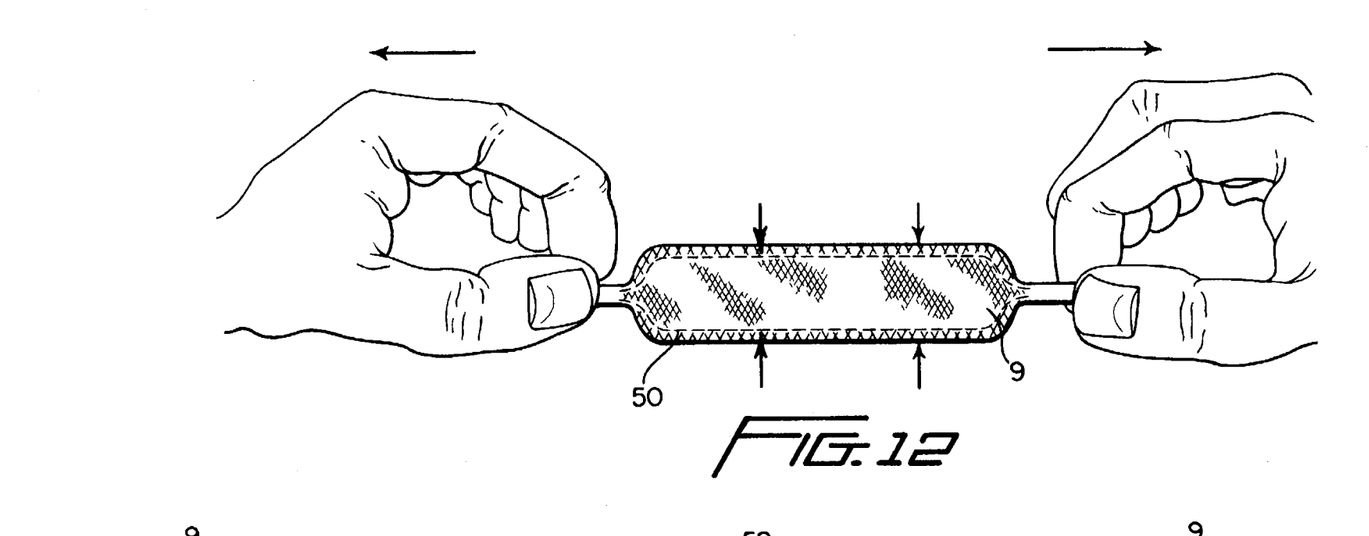
FIGS. 12 and 13 are perspective views illustrating further details of the embodiment of FIGS. 1–5.
Figure 13:
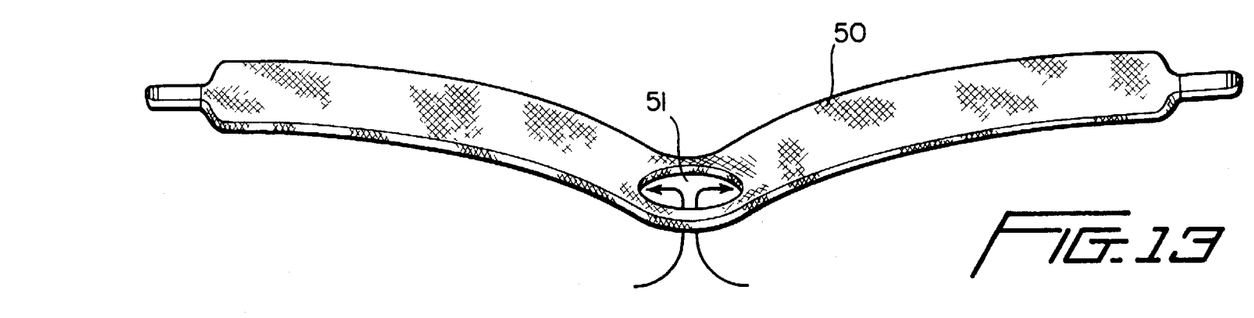

A preferred lace material into which the optical element is inserted is 300D nylon lace, schematically illustrated in FIG. 12, which under normal tensions involved in tying shoe laces will deform from about 8 mm in width to 6 mm, and not more than to 5 mm. The lace can be assembled by threading the flexible optical element through an envelope-shaped portion of the lace material, using a sharp tipped instrument or a pointed end of the optical element itself to move the nylon aside and form a hole into which the flexible optical device with its LED and a miniature printed circuit board are inserted, the small hole being made into a larger hole 51 without breaking the lace structure as illustrated in FIG. 13, after which the ends of the lace can be stretched to return the lace material to its original configuration, closing the opening and flattening the optical device thus inserted.

Figure 14A:
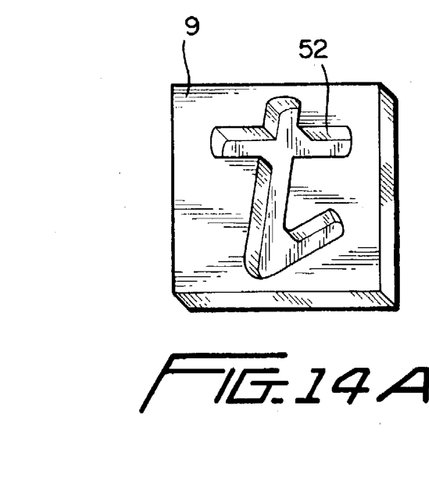
FIGS. 14, 14A, and 14B are perspective views illustrating a still further aspect of the embodiment of FIGS. 1–5.
Figure 14B:
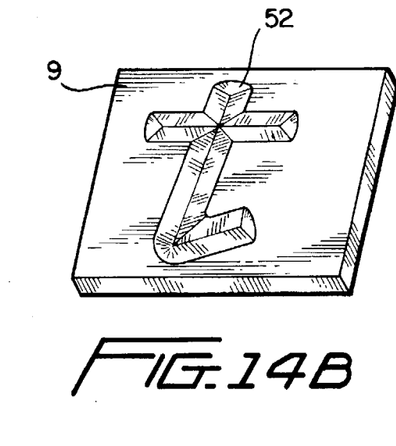
Figure 14C:
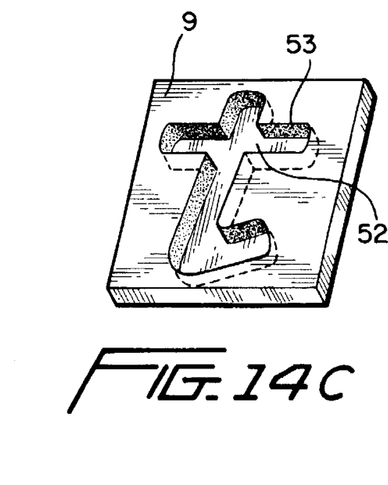

FIGS. 14A-14C illustrates in greater detail the formation of patterns in the optical element apart from the uniform illumination pattern. In this case, a letter "t" is formed by forming grooves 52 in the optical element, the shape of the grooves determining the optical effect. For example, the grooves could have a rectangular cross-section as illustrated in FIG. 14A, or the grooves could be "v"-shaped as illustrated in FIG. 14B. In addition, as illustrated in FIG. 14C, a surface 53 of the grooves can be sand blasted subsequent to formation to enhance the effect provided by the grooves.

Figures 15, 15A:
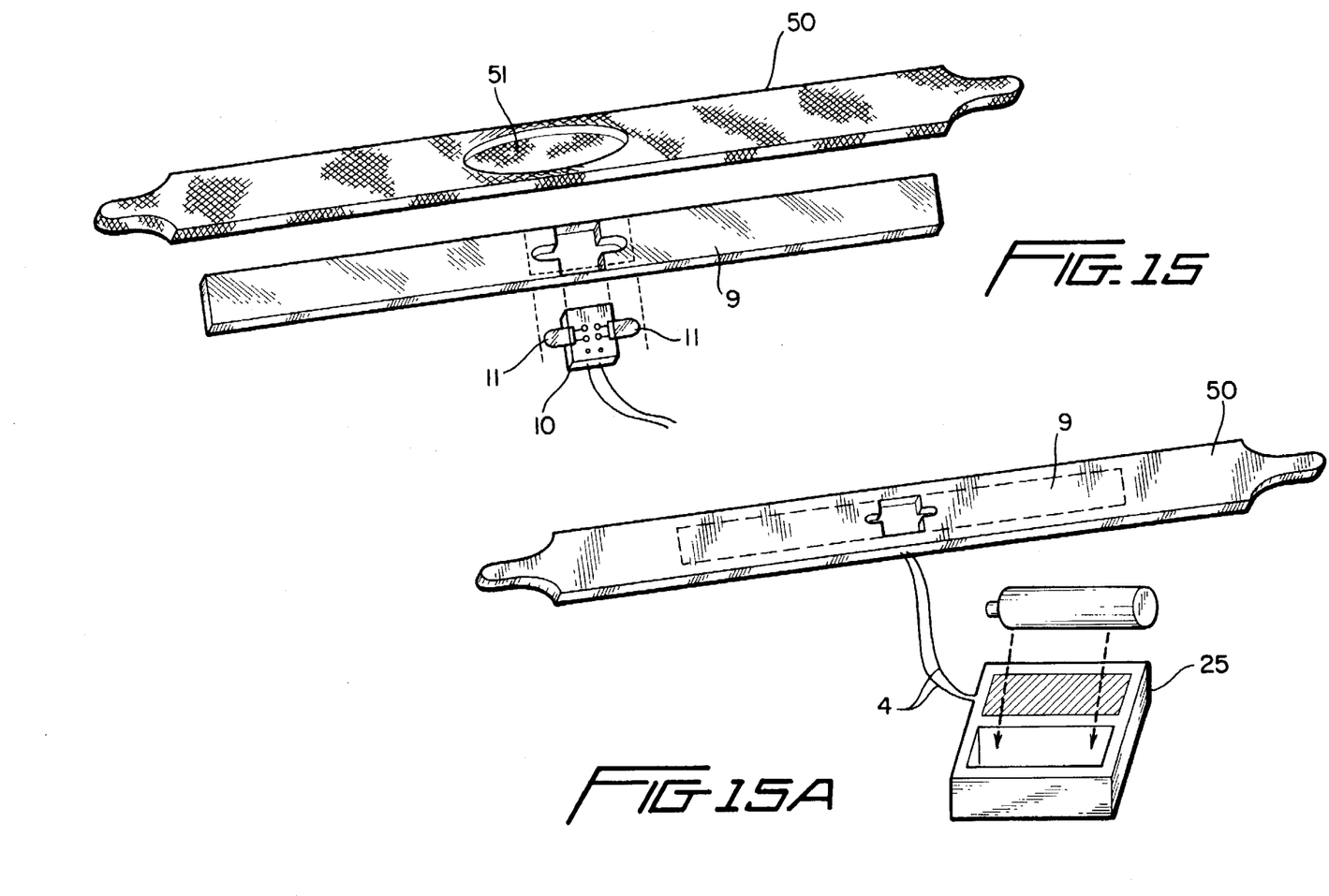
FIGS. 15 and 15A are perspective views illustrating a variation of the embodiment shown in FIGS. 1–5.
Figure 16:
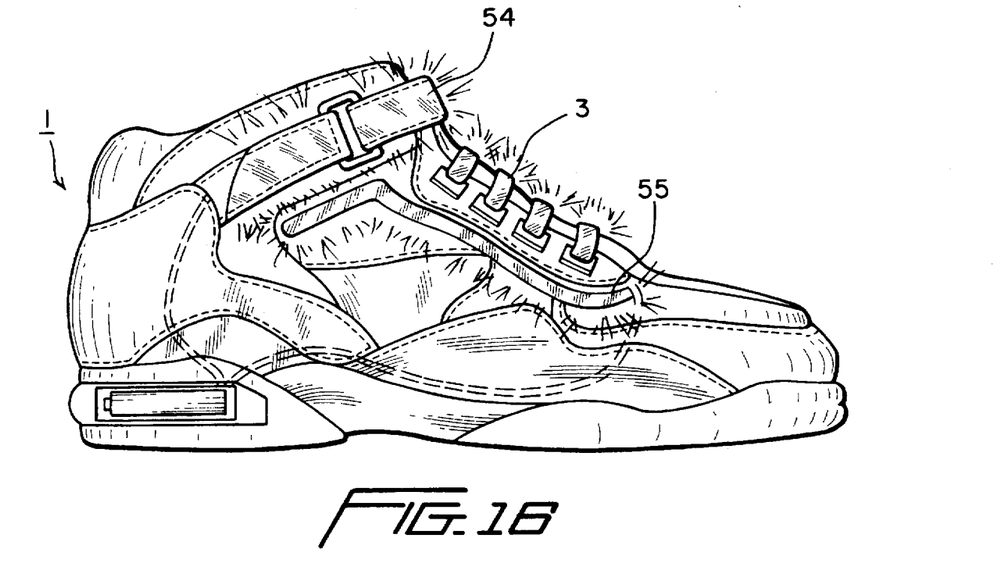
FIGS. 16 is a perspective view illustrating a variation of the preferred embodiment of FIG. 1.
Figure 16A:
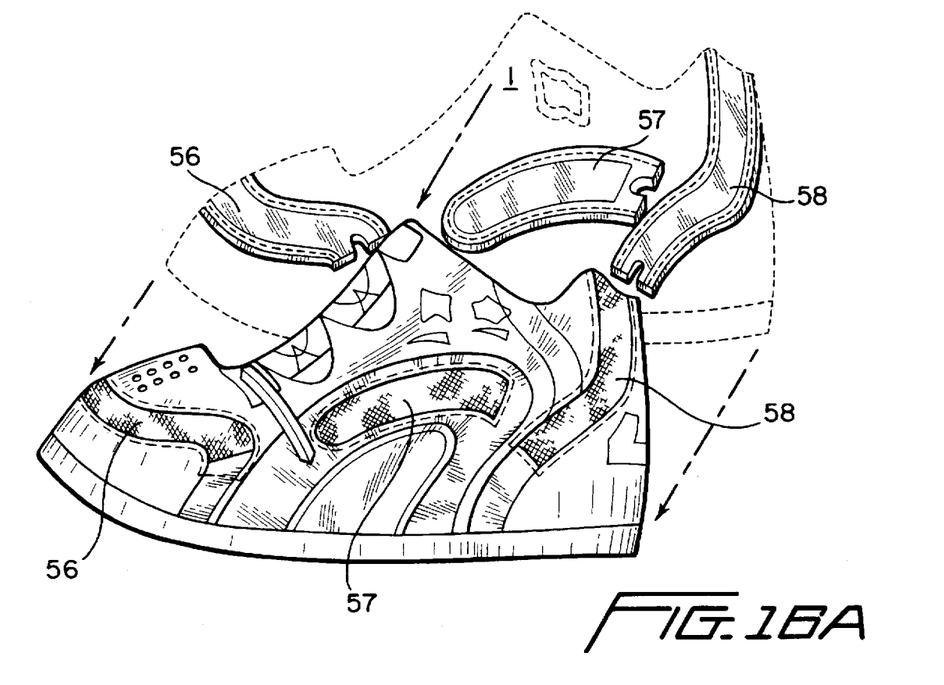
FIG. 16A is a perspective view illustrating a soft object constructed in accordance with the principles of a second preferred embodiment of the invention.

As illustrated in FIGS. 15 and 15A, the illumination arrangement of the first preferred embodiment of the invention may be varied by changing the orientation of the miniature circuit board on which the light emitting diodes are mounted, while as illustrated in FIG. 16, the shoe shown in FIG. 1 may be modified to include additional illumination assemblies, including an illuminated strap 54 and strip or panel 55, each of which can be illuminated by different shapes and colors of light emitting diode. Alternatively, the shoe of FIG. 1 may be modified to include a variety of illuminated decorative panels 56-58 incorporating the light distribution principles of the invention, as shown in FIG. 16A, or the strap/panel arrangement may be used in a different type of footwear, such as the sandal 59 illustrated in FIG. 17, or the lace assemblies of the first preferred embodiment of the invention may be used on different types of footwear, such as the ice skate 60 of FIG. 18, in which the power pack 61 is positioned on either the lower part of the boot or affixed to the blade 62 or a skate-attachment bracket and one of the lace assemblies 60' is decorative in nature and has the construction illustrated in FIG. 18A.

Figure 17:
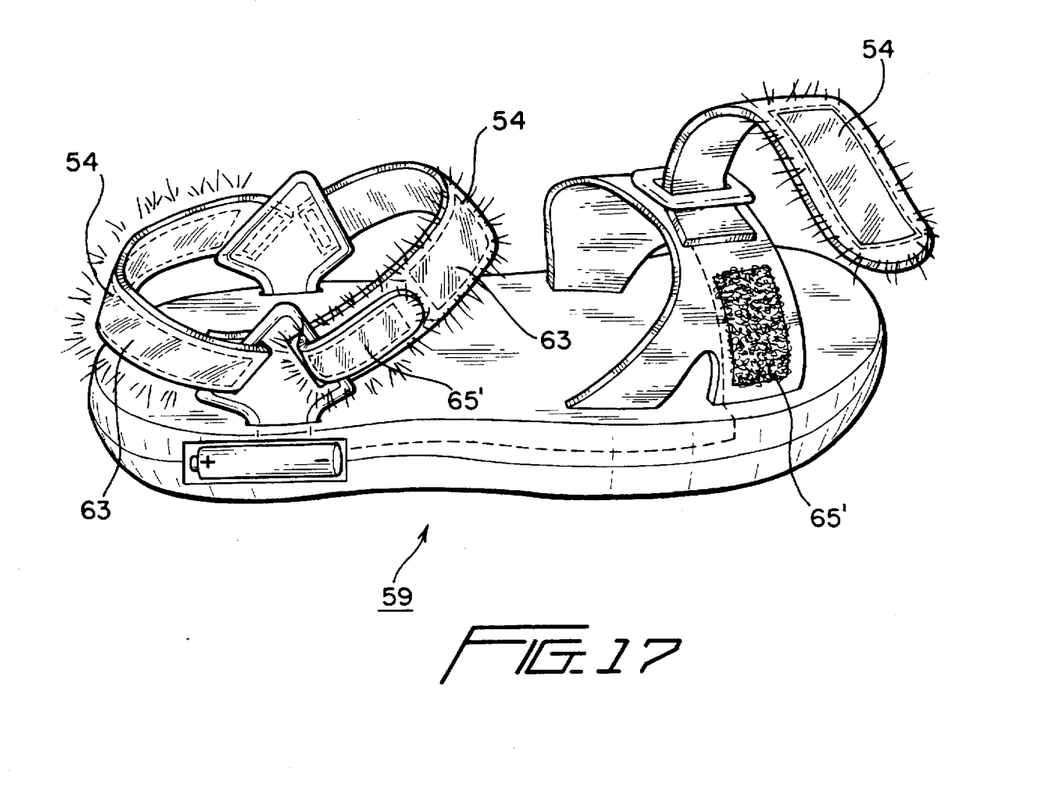
FIG. 17 is a perspective view of a variation of the soft object of the second preferred embodiment of the invention.
Figures 17A, 18A, 19A, 19B, 19C, 20:
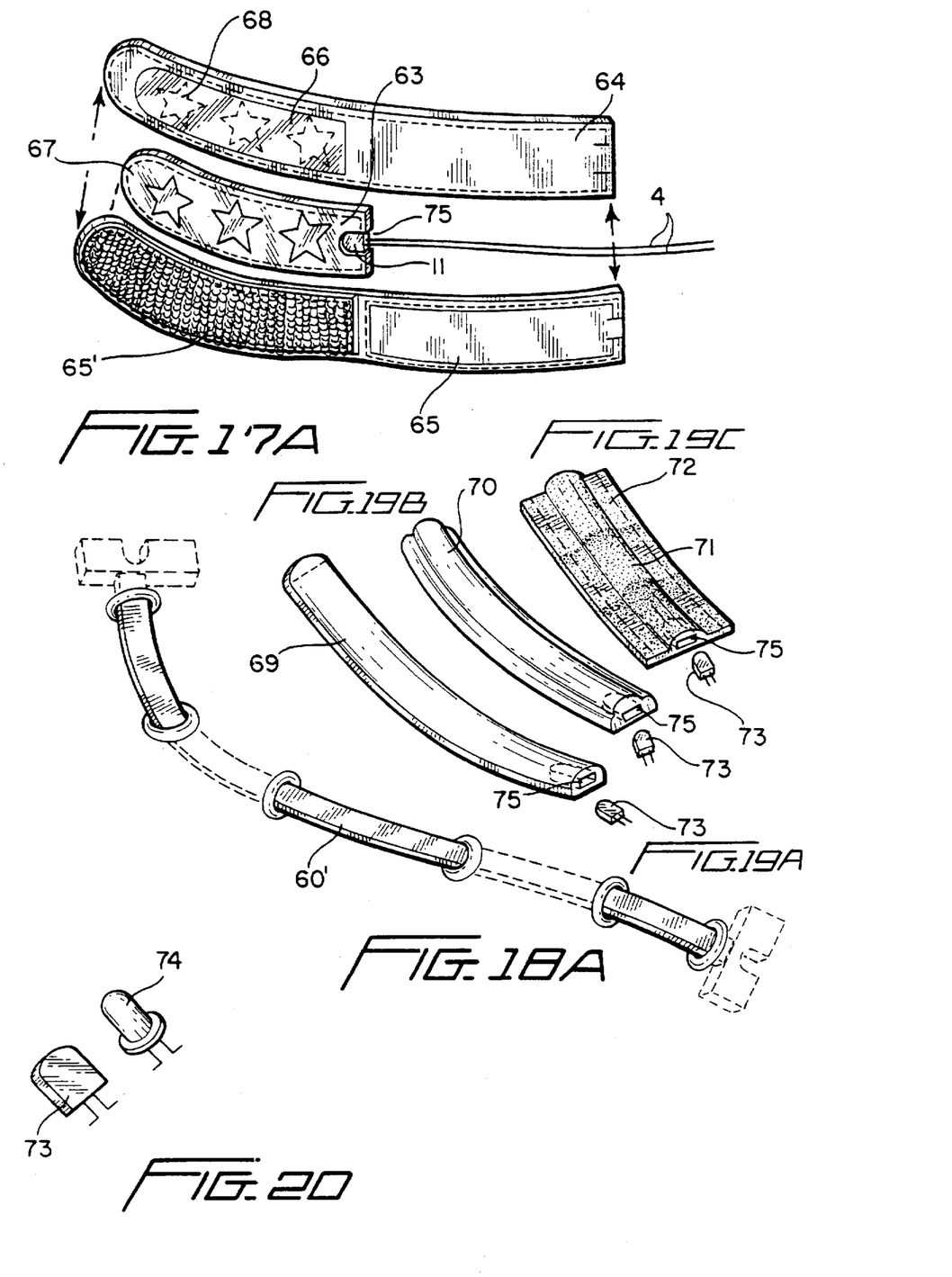
Figure 18:
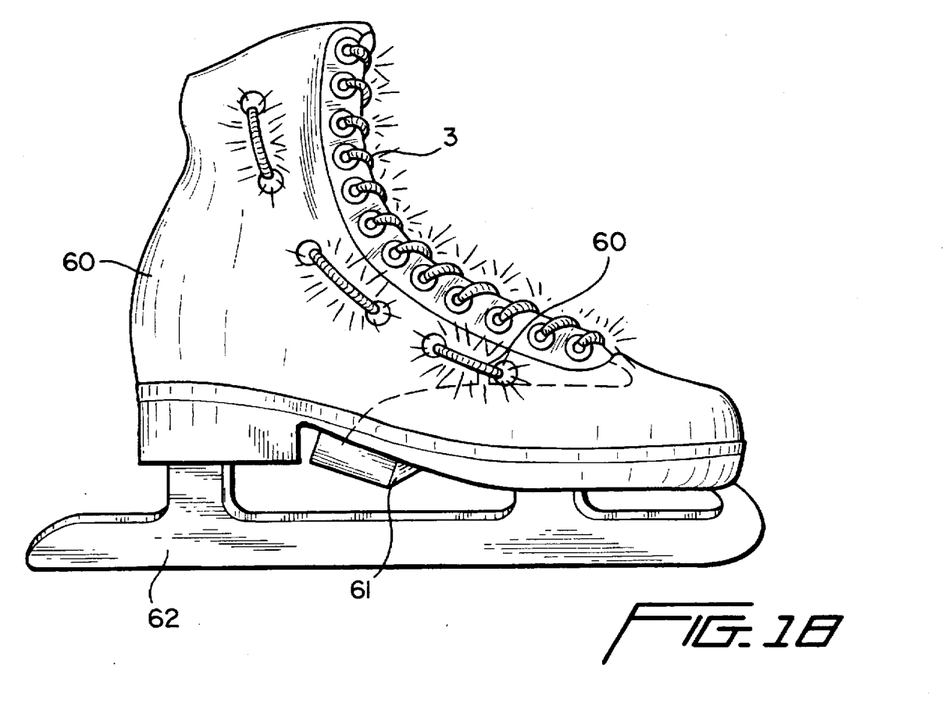
FIG. 18 is a perspective view of a further variation of a soft object according to the first preferred embodiment of the invention.

The straps or panels shown in FIGS. 16 and 17 constitute a second preferred embodiment of the invention, illustrated in greater detail in FIGS. 17A, in which the optical element 63 is sandwiched between layers 64 and 65 of the strap, at least one of the layers including windows or openings 66 through which the optical element is visible. As in the first preferred embodiment of the invention, the optical element itself may include pattern forming grooves 67 in addition to the sand blasting treatment illustrated in FIGS. 7-11, or the windows through which the optical element is visible can itself include designs and patterns 68. Advantageously, in this embodiment of the invention, the optical element can be secured in place by stitching through the edges of the optical element when the two layers 64 and 65 are stitched together, thereby avoiding the need for separate assembly steps to secure the optical element to the strap. The strap in question may be purely decorative, or may serve as a fastening strap, including for example a fastening tape 65' made of VELCRO™ hook and loop fastener, or a similar material.

Finally, FIGS. 19, 19A, and 19B illustrate further variations in the types of optical elements that can be constructed according to the principles of the preferred embodiments of the invention, including an optical element 69 having a convex upper surface, an optical element 70 having an irregularly shaped surface, and an optical element 71 having a flange or extension 72 for enabling the optical element to be stitched directly to the surface of a soft object, and FIG. 20 shows two different types of light emitting diode 73 and 74, one having a flat shape with a thickness of less than five millimeters, and the other being substantially cylindrical, both of which can be accommodated within the optical elements of the preferred embodiments by appropriately shaping the openings 75 at the coupling end thereof. It will of course be appreciated by those skilled in the art that the illustrated shapes for both the optical element and the light emitting diodes represent but a few of numerous different possible shapes of elements utilizing the above principles, and that the illustrated items of apparel represent just a few of the soft objects, such as watchbands, belts, purse straps, to which the principles of the invention may advantageously be applied.

Having thus described various preferred embodiments of the invention, those skilled in the art will appreciate that variations and modifications of the preferred embodiment may be made without departing from the scope of the invention. It is accordingly intended that the invention not be limited by the above description or accompanying drawings, but that it be defined solely in accordance with the appended claims.

I claim:

1. In an illumination arrangement capable of being mounted on a soft object, including:
    at least one light emitting diode;
    a transparent flexible member optically coupled to the light emitting diode which forms a means for transmitting light emitted by the light emitting diode and emitting said light over an extended surface area,
    the improvement wherein a transmittivity of a surface of the transparent flexible member varies with distance from the light emitting diode such that a greater amount of light is emitted through an area of the surface located away from the light emitting diode than from an area of the surface located closer to the light emitting diode, such that light is emitted uniformly from said surface, and
    the further improvement wherein the light emitting diode is positioned within the transparent flexible member to maximize transmission of light from the light emitting diode to the transparent flexible member.

2. An illumination arrangement as claimed in claim 1, further comprising a DC power source and electric control circuit means for supplying electric current to the light emitting diode.

3. An illumination arrangement as claimed in claim 2, wherein the electric control circuit means are mounted on a circuit board and said DC power source and circuit board are contained within a housing.

4. An illumination arrangement as claimed in claim 3, wherein the circuit board is connected by wires to a second circuit board on which the light emitting diode is mounted, said second circuit board being supported by a bracket which also holds the flexible member.

5. An illumination arrangement as claimed in claim 4, wherein the flexible member includes an opening having a shape corresponding to a shape of the light emitting diode, the light emitting diode being fitted within the opening to maximize coupling of light emitted by the diode with the flexible member.

6. An illumination arrangement as claimed in claim 5, wherein the bracket is mounted on a tongue of footwear.

7. An illumination arrangement as claimed in claim 5, wherein the second circuit board, the light emitting diode, and the flexible member are enclosed within a shoelace material.

8. An illumination arrangement as claimed in claim 7, wherein an end of the flexible member is pointed to facilitate insertion of the flexible member through the shoelace material without breaking the lace material.

9. An illumination arrangement as claimed in claim 1, wherein the flexible member includes an opening having a shape corresponding to a shape of the light emitting diode, the light emitting diode being fitted within the opening to maximize coupling of light emitted by the diode with the flexible member.

10. An illumination arrangement as claimed in claim 1, wherein the flexible member has a light diffusing surface.

11. An illumination arrangement as claimed in claim 1, further comprising additional light emitting diodes and flexible members optically coupled the additional light emitting diodes.

12. An illumination arrangement as claimed in claim 11, wherein the additional light emitting diodes have different colors.

13. An illumination arrangement as claimed in claim 1, further comprising a power supply circuit having a low on-time rate and high frequency cycles to save power.

14. An illumination arrangement as claimed in claim 13, wherein further power savings are achieved by providing a single battery and a voltage raising circuit for raising a voltage output of the battery to a voltage sufficient to trigger illumination of the light emitting diode.

15. An illumination arrangement as claimed in claim 1, wherein the flexible member and light emitting diode are secured between layers of a footwear strap, one of said layers having an opening through which said light is visible.

16. An illumination arrangement as claimed in claim 1, wherein the flexible member and light emitting diode are secured between layers of a footwear decorative panel, one of said layers having an opening through which said light is visible.

17. An illumination arrangement as claimed in claim 1, wherein the variation in the light transmitting properties of the flexible member is achieved by directing pressurized air at the surface of the flexible member, and adding particles to the resulting airstream to roughen the surface.

18. An illumination arrangement as claimed in claim 1, further comprising grooves in the surface of the flexible member arranged to cause light emitted from the surface to form designs visible against a predetermined background illumination.

* * * * *

UNITED STATES PATENT AND TRADEMARK OFFICE
CERTIFICATE OF CORRECTION

PATENT NO. : 5,722,757
DATED : 03/03/98
INVENTOR(S) : CHIEN

It is certified that error appears in the above-identified patent and that said Letters Patent is hereby corrected as shown below:

On the title page, item [76], change the Inventor's first name from "Thang Lu" to --Tseng-Lu--;

Change the street address from "Lin-Shon Street" to --Lin-Shen Road--; and

Change the city from "Taipei, Haeng" to --Taipei Hseng--.

Signed and Sealed this

Twelfth Day of May, 1998

Attest:

BRUCE LEHMAN

*Attesting Officer*    *Commissioner of Patents and Trademarks*